United States Patent [19]
Quinn

[11] Patent Number: 5,797,979
[45] Date of Patent: Aug. 25, 1998

[54] REMOVAL OF ACID GASES FROM GAS MIXTURES USING ION EXCHANGE RESINS

[75] Inventor: Robert Quinn, East Texas, Pa.

[73] Assignee: Air Products and Chemicals, Inc., Allentown, Pa.

[21] Appl. No.: 787,844

[22] Filed: Jan. 23, 1997

[51] Int. Cl.$^6$ .................................................. B01D 53/04
[52] U.S. Cl. ....................... 95/97; 95/102; 95/136; 95/139; 95/148; 96/144; 96/153
[58] Field of Search ........................... 95/136, 139, 135, 95/137, 95, 97, 102, 148; 96/153, 108, 143, 144

[56] References Cited

U.S. PATENT DOCUMENTS

| | | | |
|---|---|---|---|
| 3,141,729 | 7/1964 | Clarke et al. | 95/139 |
| 3,466,138 | 9/1969 | Spiegler et al. | 429/13 |
| 3,498,026 | 3/1970 | Messinger et al. | 95/139 |
| 3,917,469 | 11/1975 | Cotter et al. | 95/900 |
| 4,604,270 | 8/1986 | Tom | 95/139 |
| 4,713,091 | 12/1987 | Govind | 95/139 |
| 5,091,080 | 2/1992 | Van Eikeren et al. | 95/46 |
| 5,336,298 | 8/1994 | Quinn et al. | 95/49 |

FOREIGN PATENT DOCUMENTS

| | | | |
|---|---|---|---|
| 1-208310 | 8/1989 | Japan | 95/139 |
| 7-24334 | 1/1995 | Japan . | |
| 1088761 | 4/1984 | U.S.S.R. | 95/139 |

OTHER PUBLICATIONS

Ind. Eng. Chem, Robert Cole and H.L. Shulman, "Adsorbing Sulfur Dioxide on Dry Ion Exchange Resins for Reducing Air Pollution", vol. 52, pp. 859–860 (1960).

Teor. Prakt. Sorbtsionnykh Protsessov, vol. 13, pp. 99–103 (1980).

Mendeleev Chem J, A.I. Bulikh, V.A. Bogatyrev, and A. A. Alovyainikov, "Use of Ion–Exchange Resins for Absorption and Purification of Gases", vol. 15, pp. 81–87 (1970).

I & EC Prod. Res. Dev, Lawrence Layton and G.R. Youngquist, "Sorption of Sulfur Dioxide by Ion Exchange Resins", vol. 8, pp. 317–324 (1969).

Ind. Eng. Chem. Res., Ten–Wen Chen and Neville G. Pinto, "Stability and Equilibrium Properties of Macroreticular Resins for Flue Gas Desulfurization", vol. 29, pp. 440–447 (1990).

Journal of Applied Poly. Sci., Abderrahmane Diaf, Jose L. Garcia and Eric J. Beckman, "Thermally Reversible Polymeric Sorbents for Acid Gases: $CO_2$, $SO_2$, and $NO_x$, ", vol. 53, pp. 857–875 (1994).

I & EC Product Research and Development, Frank Pollio and Robert Kunin, "Macroreticular Ion Exchange Resins as Hydrogen Sulfide Sorbents", vol. 7, pp. 62–65 (1968).

Ind. Eng. Chem. Prod. Res. Develop., Ayalur S. Vaidyanathan and Gordon R. Youngquist, "Sorption of Sulfur Dioxide, Hydrogen Sulfide, and Nitrogen Dioxide by Ion–Exchange Resins", vol. 12, pp. 288–293 (1973).

*Primary Examiner*—Duane S. Smith
*Attorney, Agent, or Firm*—Mark L. Rodgers

[57] ABSTRACT

A process is provided for selectively removing acid gases from a gas mixture by contacting said gas mixture with an anion exchange resin containing quaternary ammonium functionalities and moderately basic counteranions. The absorption process is reversible and the absorbent can be regenerated using an inert gas purge or by applying a vacuum.

9 Claims, No Drawings

REMOVAL OF ACID GASES FROM GAS MIXTURES USING ION EXCHANGE RESINS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Numerous industrial processes require the separation of one or more acid gases from gas mixtures. Typical examples are the separation of carbon dioxide from hydrogen in hydrogen synthesis plants and the separation of both $CO_2$ and hydrogen sulfide in the cleanup of natural gas ($CH_4$). A variety of methods are currently used to perform such separations but there is a continuing effort to develop new, more efficient separation techniques. Most often, acid gas removal is accomplished by the use of alkanolamines. Although usage of alkanolamines is widespread, this technology has several major drawbacks. Alkanolamine based scrubber suffer from relatively large regeneration energies, amine oxidation, corrosion, and the potential loss of volatile organics to the environment.

Two types of ion exchange resins have been utilized to separate acid gases from gas mixtures. One type is the so-called strongly basic anion exchange resins which contain quaternary ammonium functionalities coupled with a counteranion. The second type includes weakly basic anion exchange resins which contain amino groups in the free base form. Several references teach the use of such resins for the removal of sulfur dioxide. For example, the utility of strongly basic anion exchange resins are found in Ind. Eng. Chem. 52, 859–860 (1960) which reports that Amberlite® IRA-400 resin absorbs 98 cc $SO_2$/g resin (280 mg $SO_2$/g resin) at 5 cmHg. Regeneration with dry air at 100° C. resulted in desorption of about 70% of the bound gas. Mendeleev Chem. J., 15, 81–87 (1970) reports that strongly basic anion exchange resins in the $OH^-$ or $CO_3^{2-}$ form absorbed $SO_2$ and other strongly acidic gases. Regeneration, however, required washing with aqueous caustic solution. The chloride form of Dowex®-21K resin also reportedly absorbed $SO_2$ from dry gas streams but rates of sorption were generally low. An example of the utility of weakly basic anion exchange resins can be found in I&EC Prod. Res. Dev., 8, 317–324 (1969) which reports that the tertiary amine containing resin Amberylst® A-21 reversibly absorb $SO_2$. At 50 mmHg, the resin absorbed 350 mg $SO_2$/g resin with partial regeneration achieved by heating to 90° C. under vacuum.

Additionally, several references teach the utilization of ion exchange resins for $CO_2$ separations. Primarily weakly basic or strongly basic anion exchange resins have been used. U.S. Pat. No. 3,466,138 cites the use of the strongly basic anion exchange resin Amberlyst® XN-1002 as a $CO_2$ absorbent. The resin is converted to its reactive form by treatment with aqueous strong base. Carbon dioxide absorption occurs via bicarbonate formation with regeneration accomplished by purging with hot, humid, inert gas streams. Japanese patent 7-24334 claims the use of strongly basic anion exchange resins as gas adsorbents. Specifically, the resins have pendant benzylic quaternary ammonium moieties in which the benzylic carbon atom is substituted with two R groups, preferably methyl. The resin counterion is simply specified as an anion ($X^-$), such as $Cl^-$, $Br^-$, $I^-$, $SO_4^{2-}$, $NO_3^-$, $OH^-$, and others. Numerous gases, including $CO_2$, are cited as ones which can be absorbed by such resins but sorption data was not reported. It was stated that desorption is ordinarily performed by washing with a basic aqueous solution.

Ind. Eng. Chem. Res. 29, 440–447 (1990) reports that the weakly basic anion exchange resin Dowex MWA-1 absorbs 24 mg $CO_2$/g resin at 35° C. and 100 kPa. U.S. Pat. No. 3,610,620 cites the use of weakly basic amino resins for which the "$OH^-$ form" (presumably the free base of the amine) absorbs $CO_2$. Regeneration was accomplished by purging with $CO_2$ free gas at 20° C. or 50° C. U.S. Pat. No. 3,466,138 (1969) teaches the use of the weakly basic anion exchange resin Amberlite® IRA-68, which contains tertiary amino groups as a $CO_2$ absorbent. Regeneration was accomplished by purging with hot, humid, inert gas streams. J. Appl. Poly. Sci. 53, 857–875 (1994) reports the $CO_2$ absorption properties of uncrosslinked copolymers of vinylbenzene and vinylbenzylchloride functionalized by reaction with various diamines. The resulting pendant amino group reportedly absorbs $CO_2$ by formation of a zwitterion carbamate. Sorption capacities in mole of $CO_2$ per mole of amino nitrogen atoms were 0.18 for primary amines, 0.07 for secondary amines, and 0.02 for tertiary amines. Regeneration was accomplished by heating to 105° C.

Strongly basic anion exchange resins in the $OH^-$ or $Cl^-$ form have also been used to separate $H_2S$ from gas mixtures. As expected, the $OH^-$ form of the such resins has a high affinity for $H_2S$ and, thus, requires extreme conditions for regeneration. This is shown by Teor. Prakt Sorbtsionnykh Protsessov, 13, 99–103 (1980) (CA 95:102262) which reports $H_2S$ sorption capacities of 70–74 mg $H_2S$/g resin for various resins in the $OH^-$ form. Regeneration required washing the resin with aqueous 5% NaOH. Similarly, Mendeleev Chem. J., 15, 81–87 (1970) reports sorption of $H_2S$ by strongly basic resins in the $OH^-$ form, for example, Amberlite® IRA-410 which absorbed 3 mmole $H_2S$/g resin (102 mg/g resin). Regeneration again required washing with aqueous base.

Strongly basic anion exchange resins in the $Cl^-$ form have lower $H_2S$ affinities and are more readily regenerated. I&EC Prod. Res. Dev., 7, 62–65 (1968) reports the $H_2S$ sorption properties of Amberlite® XN-1007 and Amberlyst® A-27 resins. Amberlylst® A-27 sorbs 20–24 mg $H_2S$/g resin. Hydrogen sulfide loaded resins can be regenerated under a $N_2$ purge at 100°–110° C. Ind. Eng. Chem Proc. Des. Develop., 12,288–293 (1973) reports that Amberlyst® A-26 resin at 25° C. sorbs 470 mg $H_2S$/g resin at 400 mmHg and ~70 mg $H_2S$/g resin at 10 mmHg. However, sorption rates were very slow, sometimes greater than 8 days.

In addition to the use of ion exchange resin for acid gas separations, the use of the related polymers known as polyelectrolytes has been reported. Polyelectrolytes are polymers with a high ionic content, usually one ionic unit per repeat unit. Generally, polyelectrolytes are uncrosslinked polymers which are water soluble. U.S. Pat. No. 5,336,298 discloses that certain polyelectrolytes can function as reversible absorbents of acid gases. These include quaternary ammonium containing polyelectrolytes with, for example, fluoride counterions. Such polyelectrolytes are not crosslinked and are readily soluble in water.

The practical use of the polyelectrolytes of U.S. Pat. No. 5,336,298 as acid gas absorbents would be quite difficult. These polymers are dense materials with no appreciable porosity and modest surface area and, thus, gas absorption and desorption are quite slow. In addition, polyelectrolytes are affected by water vapor, a common component of various acid gas containing process streams. At high water vapor concentrations, swelling and gelation of the absorbent may result in additional loss of surface area. Low water vapor concentrations can result in a densification or "tightening" of the polyelectrolyte structure resulting in slower gas absorption.

BRIEF SUMMARY OF THE INVENTION

The present invention is a process for separating acid gases, specifically $CO_2$ and $H_2S$, from gas mixtures using an ion exchange resin. The resins used in this process are macroreticular anion exchange resins which contain quaternary ammonium functionalities and counteranions chosen from fluoride, acetate, or other moderately basic anions. Such resins when contacted with a gas mixture containing one or more acid gases selectively absorb the acid gas or gases, thereby separating them from the other components in the gas mixture. Absorption is reversible and gas-free absorbent can be regenerated by reducing the pressure of acid gas above the absorbent by the use of an inert gas purge at ambient or slightly elevated temperature or by application of vacuum.

Unlike the resins in the prior art, the macroreticular resins used in the present invention, have high porosity and surface area which permits relatively fast absorption and are also largely unaffected by water vapor. Since these resins are water insoluble, there is little swelling and no gelling in the presence of high water vapor concentrations. Additionally, the use of dry gas streams has no effect on the performance of the absorbent.

BRIEF DESCRIPTION OF THE SEVERAL VIEWS OF THE DRAWINGS

Not applicable.

DETAILED DESCRIPTION OF THE INVENTION

The present invention is a process for separating acid gases from gas mixtures using an ion exchange resin. Ion exchange resins generally consist of an insoluble polymer matrix to which are attached charged functional groups. The resins used in the present process are anion exchange resins which consist of a cationically charged polymer associated with negatively charged counterions. To achieve maximum absorption capacities and rates of absorption, the preferred material is a macroreticular ion exchange resin. Such resins have high surface areas and porosities which permit exposure of virtually all of the resin active sites to gas. The resins are utilized in the form of small beads consisting of a crosslinked polymeric material.

Anion exchange resins termed "strongly basic" are best suited to the present invention. The term strongly basic is derived from the hydroxide form of such resins where OH⁻ is associated with pendant cationic groups. Another common form of "strongly basic" resins is one where chloride replaces OH⁻. In the literature, the term "strongly basic" is applied to such chloride-containing resins even though the chloride ion is an extremely weak base. Most strongly basic anion exchange resins contain pendant quaternary ammonium groups which may be represented by the notation $P-NR_3^+$, where P is the polymer and R is an alkyl or similar group. Two types of strongly basic anion exchange resins are commercially available: Type I are those which contain trialkylammonium groups, and Type II contain dimethylethanol ammonium groups. Examples include Amberlyst® A-26 and Dowex® MSA-1, which are both Type I resins, and Amberlite® IRA 910, which is a Type II resin.

The Cl⁻ form of a strongly basic anion exchange resin is unreactive with respect to acid gases and the quantities of such gases absorbed are low. However, strongly basic anion exchange resins containing fluoride, acetate, or other suitable counterions (as described below) exhibit relatively large acid gas absorption capacities. Hence, the fluoride form of Amberlyst® A-26 resin, abbreviated F⁻ Amberlyst® A-26, can be used to remove acid gases such as $CO_2$ or $H_2S$ from gas mixtures. This is accomplished by passing a gas mixture through a column packed with the resin. The resin absorbs acid gases while the non-acid gases in the mixture pass through the column. Thus, a gas or gas mixture essentially free of acid gas can be obtained at the column exit. Typical gas mixtures which can be treated are those containing $CO_2$ and/or $H_2S$ in combination with $H_2$, $CH_4$, $N_2$, $O_2$, CO, Ar and other non-acid gases. Regeneration of the gas free absorbent is facile and can be accomplished by means of reducing the pressure of acid gas above the absorbent which can be accomplished by a variety of methods. These include purging the resin with an inert gas at ambient or slightly elevated temperature or placing the resin under a dynamic vacuum. A slight increase in temperature from 23° C. to 50° C. significantly improves the extent of regeneration which can be obtained using an inert gas purge. Improved regeneration can also be accomplished by purging the with a humidified inert gas followed by a dry inert gas purge.

To exhibit an absorption capacity substantially greater than the Cl⁻ form of a particular resin, the resin must contain a moderately basic anion. In particular, anions which are the conjugate bases of acids with $pK_a$ greater than 3 and less than 14 are most suitable. These include anions such as F⁻, the conjugate base of hydrofluoric acid ($pK_a$ 3.5), and acetate, the conjugate base of acetic acid ($pK_a$ 4.8). Resins containing anions which are conjugate bases of strong acids exhibit low $CO_2$ absorption capacities. Typical of such anions is Cl⁻, the conjugate base of hydrochloric acid ($pK_a$ −8). The $CO_2$ absorption capacity of the chloride form of Amberlyst® A-26 is less than 5% of that of the F⁻ form of the resin. Strongly basic anion exchange resins which contain very basic anions, such as OH⁻, have very large acid gas absorption capacities. However, the acid gas affinity of such resins are so great that regeneration of the gas-free absorbent is impractical. Thus, resin containing anions of moderate basicity are those which exhibit substantial acid gas absorption capacities and which permit regenerated under mild conditions.

The preferred resins of the current invention are macroreticular strongly basic anion exchange resins. Examples of such resins are Amberlyst® A-26, Amberlite® IRA 910, Dowex® MSA-1, a resin supplied by Scientific Polymer Products, Inc. and designated as SP2 722, and numerous others. Such resins, unlike conventional polymeric absorbents or gel-type ion exchange resins, have high surface areas and porosities which permit exposure of nearly all of the reactive sites of the resin to gas. Further, such resins are largely unaffected by the presence of water vapor in the gas mixture to be treated. Water vapor is often a common component of acid gas containing process streams. Since macroreticular resins experience neither appreciable swelling or geling in the presence of water vapor, surface area and porosity are largely unaffected by the concentration of water vapor in a process stream. Unlike conventional polymer absorbents, macroreticular resins are unaffected by the absence of water vapor and can be used to remove acid gases from anhydrous gas streams.

The following examples are presented to better illustrate the present invention and are not meant to be limiting.

EXAMPLES

Example 1

Synthesis of Ion Exchange Resins

Preparations of the desired counterion form of various resins were performed by literature procedures or modification thereof using commercially available ion exchange resins in the chloride form as starting materials. Typical are the preparations of the fluoride and acetate forms of Amberlyst® A-26 resin which are described below.

F$^-$ Amberlyst® A-26 resin was prepared by the method described in Reactive Polymers 23, 101 (1994) with some slight modifications. As received chloride form of Amberlyst® A-26, 102 g, was placed in a 250 mL Nalgene Buchner funnel. The resin was washed repeatedly with 1M NaOH (total volume about 10 L) until the washings were nearly Cl$^-$ free as judged by testing with HNO$_3$/AgNO$_3$. The resin was then washed with deionized water until the washing were neutral, with 1M HF (~1 L) until acidic, and with water again until neutral. Following washing with 800 mL acetone and then 250 mL ether, the resin was dried at room temperature under vacuum overnight. The fluoride form of the other resins listed in Table 1 were prepared by an identical procedure except that the ether wash was eliminated.

The acetate form of Amberlyst® A-26 was prepared in a similar manner. The as received chloride form of Amberlyst® A-26, 32 g, was washed with 1M NaOH until the washings were almost Cl$^-$ free. The resin was then washed with 1M acetic acid until the pH of the washings was the same as that of the acid solution (pH 2.8). The resin was washed with deionized water until the washings were neutral. Following washing with acetone, the resin was dried at room temperature under vacuum overnight. Water contents were determined using Karl Fischer titration techniques.

TABLE 1

Exchange capacities and water content of resins evaluated.

| resin | exchange cap.[a] Cl$^-$ form meq/g | X$^-$ | exchange cap.[a] X$^-$ form meq/g | water content[b] weight % | water content[b] mol H$_2$O/ mol X$^-$ |
|---|---|---|---|---|---|
| Amberlyst ® A-26 | 4.4 | F$^-$ | 4.7 | 27.6 | 4.5 |
|  |  | OAc$^-$ | 4.0 | 8.23 | 1.25 |
| Dowex ® MSA-1 | 4.0 | F$^-$ | 4.3 | 17.0 | 2.65 |
| SP2 722 | 4.4 | F$^-$ | 4.7 | 19.2 | 2.8 |
|  |  | OAc$^-$ | 4.0 | 10.2 | 1.6 |
| Amberlite ® IRA-910 | 3.8 | F$^-$ | 4.1 | 12.3 | 1.9 |

[a]exchange capacity based on anhydrous resin.
[b]water content prior to testing

Example 2

General Testing Procedures

Acid gas sorption properties were determined using the following procedure. A 6" long×0.5" outer diameter stainless steel column containing the resin of interest was purged with helium at 23° C. The column was subsequently exposed to a known flow rate of a feed gas consisting of 1% CO$_2$, 1% CH$_4$ in helium or 5.0% H$_2$S in CH$_4$. Gases exiting the column were analyzed by gas chromatography (GC) at regular intervals. The time to detection of CO$_2$ or H$_2$S in the exiting gases, termed "breakthrough", was used in conjunction with the feed gas flow rate to determine the quantity of CO$_2$ or H$_2$S absorbed. Absorption capacity are reported in terms of weight of gas per unit weight of resin and mole gas per mole of resin anion. The latter calculation in based on the assumptions that (1) the resin was anhydrous and (2) complete exchanged to the desired anionic form was achieved in the preparation of the resin. In actuality, molar capacities will be greater than those reported in the examples below. Following saturation of the column with acid gas, regeneration was carried out using a helium purge, 10 sccm, at a column temperature indicated in each example.

Details of the experimental procedure involving sorption of CO$_2$ by F$^-$ Amberlyst® A-26 is presented to illustrate the above general procedure. A stainless steel column packed with 3.17 g of F$^-$ Amberlyst® A-26 resin was initially purged with helium at 23° C. The column was exposed to a feed gas consisting of 1% CO$_2$, 1% CH$_4$ in helium at 12.5 sccm. Sampling of the gases exiting the column showed that CO$_2$ was present a concentration lower than the detection limit of the GC (50 ppm). The time at which CO$_2$ was detected in the exiting gases was 8.68 h, corresponding to absorption of 39.6 mg CO$_2$/g resin or 0.190 mol CO$_2$/mol F$^-$. The column was regenerated with flowing He (10 sccm) at 23° C. for 44.0 h and exposure to the feed gas was repeated.

Example 3

CO$_2$ Sorption Properties of F$^-$ Containing Ion Exchange Resins

Using the methods detailed in Example 2, the CO$_2$ sorption properties of various F$^-$ containing ion exchange resins were determined. Sorption capacities in terms of mg CO$_2$/g resin and mol CO$_2$/mol F$^-$ are listed in Table 3. Following each exposure of CO$_2$ containing gas, the resin was regenerated using helium at 10 sccm under the conditions listed in Table 3.

TABLE 3

CO$_2$ sorption properties of F$^-$ containing ion exchange resin at 23° C.

| resin | weight of resin, g | absorption cycle | mg CO$_2$/g resin | mol CO$_2$/ mol F$^-$ | regeneration conditions |
|---|---|---|---|---|---|
| F$^-$ Amberlyst ® A-26 | 3.17 | 1st | 39.6 | 0.190 | 23° C., 44 h |
|  |  | 2nd | 33.4 | 0.160 |  |
| F- Amberlyst ® A-26 | 3.71 | 1st | 24.4 | 0.117 | 50° C., 54 h |
|  |  | 2nd | 48.2 | 0.231 | 50° C., 47 h |
|  |  | 3rd | 30.4 | 0.146 |  |
| F$^-$ SP2 722 | 3.62 | 1st | 35.0 | 0.168 | 50° C., 57 h |
|  |  | 2nd | 37.7 | 0.181 |  |
| F- Dowex ® MSA-1 | 3.54 | 1st | 49.3 | 0.262 | 50° C., 30 h |
|  |  | 2nd | 34.0 | 0.181 |  |
| F- Amberlite ® IRA 910 | 3.61 | 1st | 19.1 | 0.107 | 50° C., 35 h |
|  |  | 2nd | 18.9 | 0.106 | 50° C., 65 h |
|  |  | 3rd | 16.3 | 0.092 |  |

Example 4

CO$_2$ Sorption Properties of Acetate Containing Ion Exchange Resins

Using the methods detailed in Example 2, the CO$_2$ sorption properties of various acetate (OAc$^-$) containing ion exchange resins were determined. Sorption capacities in terms of mg $CO_2$/g resin and mol $CO_2$/mol $OAc^-$ are listed in Table 4. Following each exposure to $CO_2$ containing gas, the resin was regenerated using helium at 10 sccm under the conditions listed in Table 4. Although the $CO_2$ absorption capacities of acetate containing resins were less than one-half those of the corresponding fluoride-containing resins, regeneration of the gas-free absorbent occurred more readily.

TABLE 4

$CO_2$ sorption properties of $OAc^-$ containing ion exchange resin at 23° C.

| resin | weight of resin, g | absorption cycle | mg $CO_2$/ g resin | mol $CO_2$/ mol $F^-$ | regeneration conditions |
|---|---|---|---|---|---|
| $OAc^-$ Amberlyst® A-26 | 3.06 | 1st | 12.1 | 0.0693 | 23° C., 64 h |
| | | 2nd | 12.2 | 0.0697 | 50° C., 22 h |
| | | 3rd | 14.1 | 0.0806 | 50° C., 21 h |
| | | 4th | 14.9 | 0.0850 | |
| $OAc^-$ SP2 722 | 3.36 | 1st | 7.5 | 0.0425 | 50° C., 16 h |
| | | 2nd | 9.7 | 0.0552 | 50° C., 22 h |
| | | 3rd | 10.8 | 0.0615 | 50° C., 15 h |
| | | 4th | 11.0 | 0.0623 | |

Example 5

$H_2S$ Sorption Properties of $F^-$ Containing Ion Exchange Resins

The $H_2S$ sorption properties of various fluoride containing ion exchange resins were obtained by methods analogous to those used for $CO_2$. In each case, a stainless steel column was packed with a weighed quantity of resin and purged with helium at 25° C. The column was exposed to a feed gas consisting of 5.0% $H_2S$ in $CH_4$ at 10.0 sccm. Following exposure to the $H_2S$ containing feed, the absorbent was regenerated at 50° C. 10 using a helium purge at 10.0 sccm. Sorption capacities in terms of mg $H_2S$/g resin and mol $H_2S$/mol $F^-$ are listed in Table 5.

TABLE 5

$H_2S$ sorption properties of $F^-$ containing ion exchange resin at 25° C.

| resin | weight of resin, g | absorption cycle | mg $H_2S$/g resin | mol $H_2S$/ mol $F^-$ | regeneration conditions |
|---|---|---|---|---|---|
| F- Amberlyst® A-26 | 3.61 | 1st | 35.3 | 0.215 | 50° C., 35 h |
| | | 2nd | 35.3 | 0.215 | 50° C., 21 h |
| | | 3rd | 41.7 | 0.254 | |
| F- SP2 722 | 3.54 | 1st | 22.6 | 0.140 | 50° C., 38 h |
| | | 2nd | 16.1 | 0.100 | 50° C., 34 h |
| | | 3rd | 9.7 | 0.060 | |
| F- Amberlite® IRA 910 | 3.43 | 1st | 23.3 | 0.169 | 50° C., 39 h |
| | | 2nd | 9.9 | 0.072 | 50° C., 68 h |
| | | 3rd | 9.9 | 0.072 | |

Example 6

$H_2S$ Sorption Properties of Acetate Containing Ion Exchange Resins

The $H_2S$ sorption properties of various acetate containing ion exchange resins were obtained by the methods described in Example 5. Sorption capacities in terms of mg $H_2S$/g resin and mol $H_2S$/mol $OAc^-$ are listed in Table 6.

TABLE 6

$H_2S$ sorption properties of $OAc^-$ containing ion exchange resin at 25° C.

| resin | weight of resin, g | absorption cycle | mg $H_2S$/g resin | mol $H_2S$/ mol $OAc^-$ | regeneration conditions |
|---|---|---|---|---|---|
| $OAc^-$ Amberlyst® A-26 | 2.77 | 1st | 37.1 | 0.273 | 50° C., 23 h |
| | | 2nd | 37.1 | 0.273 | 50° C., 43 h |
| | | 3rd | 28.8 | 0.212 | |
| $OAc^-$ SP2 722 | 3.91 | 1st | 29.2 | 0.215 | 50° C., 27 h |
| | | 2nd | 32.0 | 0.236 | 50° C., 62 h |
| | | 3rd | 55.4 | 0.408 | |

Example 7

Regeneration Using Humidified Purge Gas

The effectiveness of absorbent regeneration can be improved by using a humidified purge gas. A stainless steel column containing 3.55 g $F^-$ Amberlyst® A-26 resin was initially purged with dry helium and subsequently exposed to a feed gas consisting of 1% $CO_2$, 1% $CH_4$ in helium at 12.5 sccm. Regeneration was accomplished at 50° C. using dry helium. Numerous absorption/regeneration cycles (17) were repeated and it was noted that sorption capacities generally decreased for successive absorption cycles. However, it was found a substantial improvement in sorption capacity was obtained by purging with humidified helium followed by a dry helium purge. Data for absorption cycles 5 through 8 are listed in Table 7 to illustrate the effectiveness of a humidified purge gas.

TABLE 7

Effects of water vapor on regeneration of $F^-$ Amberlyst A-26 ® resin

| Absorption cycle number | mg $CO_2$/ g resin | mol $CO_2$/ mol $F^-$ | Regeneration conditions |
|---|---|---|---|
| 5 | 41.1 | 0.197 | 50° C., dry He, 26 h |
| 6 | 33.2 | 0.159 | 50° C., dry He, 29 h |
| 7 | 23.8 | 0.114 | 50° C., He, 44% RH*, 78 h |
| 8 | 53.8 | 0.258 | 50° C., dry He, 64 h |

*RH = relative humidity

Example 8 (Comparative)

$CO_2$ Sorption Properties of $Cl^-$ Amberlyst® A-26 Resin

For comparative purposes, the $CO_2$ sorption properties of the chloride form of Amberlyst® A-26 resin were determined. Prior to use, 100 g of the as received resin was washed with 500 mL water followed by 500 mL 0.8M HCl to ensure complete conversion to the $Cl^-$ form. The resin was washed repeatedly with water until the washings were neutral and then with 750 mL acetone. The product was dried under vacuum at room temperature for 2 days and at 60° C. for 3 hours resulting in a water content of 8.75% or 1.2 mol $H_2O$/mol $Cl^-$. A stainless column containing 4.46 g of this resin was exposed to a gas mixture consisting of 1% $CO_2$ and 1% $CH_4$ in helium at a flow rate of 12.5 sccm. Breakthrough of $CO_2$ was observed in less than 25 min, corresponding to an absorption capacity of 1.4 mg $CO_2$/g resin or 0.0071 mol $CO_2$/mol $Cl^-$. This value is less than 5% that obtained for the $F^-$ form of Amberlyst® A-26 resin.

Example 9 (Comparative)

$H_2S$ Sorption Properties of $Cl^-$ Amberlyst® A-26 Resin

A portion of $Cl^-$ Amberlyst® A-26 used in comparative Example 8 was used to prepare a stainless column containing 2.96 g of resin. Following initial purging with helium, the column was exposed to a gas mixture consisting of 5.0% $H_2S$ in $CH_4$ at 10.0 sccm. Breakthrough of $H_2S$ occurred at 1.25 h corresponding to sorption of 19.2 mg $H_2S$/g resin or 0.128 mol $H_2S$/mol $Cl^-$. Regeneration was performed at 50° C. with 10 sccm He for 9 h. Times required for desorption of $H_2S$ to levels lower than the limit of detection were substantially short than for fluoride-containing resins presumably because there is no chemical interaction of $H_2S$ with the resin. A second exposure to the $H_2S$ containing feed resulted in sorption of 11.6 mg $H_2S$/g resin or 0.077 mol $H_2S$/mol $Cl^-$. These sorption capacities are 60–36% those of $F^-$ Amberlyst A-26 based on capacity per mole of anion.

Example 10 (Comparative)

$CO_2$ Sorption by $OH^-$ Amberlyst® A-26 Resin

Ion exchange resins containing hydroxide counterions would be expected to absorb substantial quantities of $CO_2$ or $H_2S$. However, such absorptions are likely to be irreversible due to the high basicity of the hydroxide ($OH^-$) ion. This is illustrated by data for the $OH^-$ form of Amberlyst® A-26. The resin was prepared by washing $Cl^-$ Amberlyst® A-26 with 1M NaOH until $Cl^-$ was not detected in the washings. The resin was then washed with 200 mL acetone and dried under vacuum overnight at room temperature. This resulted in a color change to gray and a strong odor of ammonia or amine, both suggestive of some decomposition of the resin. By a Karl Fischer titration, the resin contained 30.8% water or, assuming complete conversion to the $OH^-$, 5.7 mol $H_2O$/mol $OH^-$.

A stainless column containing 3.40 g of resin was exposed to a gas mixture consisting of 1% $CO_2$ and 1% $CH_4$ in helium at a flow rate of 12.5 sccm. Breakthrough of $CO_2$ occurred after 37.6 h of gas flow, corresponding to absorption of 156 mg $CO_2$/g resin or 0.74 mol $CO_2$/mol $OH^-$. The column was purged with helium for 71.5 h at 23° C. Exposure to the $CO_2$-containing feed at 23° C. resulted in $CO_2$ breakthrough after only 1.9 h, corresponding to absorption of only 7.8 mg $CO_2$/g resin (0.037 mol $CO_2$/mol $OH^-$). Regeneration with helium at 50° C. followed by exposure to the $CO_2$ containing feed resulted in the absorption of only 2.7 mg $CO_2$/g resin or 0.013 mol $CO_2$/mol $OH^-$. In other words, regeneration of the resin at room temperature or at 50° C. resulted in desorption of only 5% and 2%, respectively, of the bound $CO_2$. These values are significantly lower than those of $F^-$ or $OAc^-$ containing resins and indicate near irreversible sorption of $CO_2$.

I claim:

1. A process for separating one or more acid gases from a gas stream containing said acid gas and at least one other component, comprising bringing said gas stream into contact with a macroreticular anion exchange resin containing quaternary ammonium functionalities and counter-anions which are the conjugate bases of acids having a pKa greater than 3 and less than 14, which anion exchange resin selectively absorbs, and thereby removes, said acid gas from the gas stream.

2. A process in accordance with claim 1 wherein said acid gas is selected from the group consisting of $CO_2$, $H_2S$ and mixtures thereof.

3. A process in accordance with claim 1 wherein said counter-anions are selected from the group consisting of fluoride, acetate and mixtures thereof.

4. A process in accordance with claim 1 wherein said anion exchange resin is utilized in the form of small beads consisting of a crosslinked polymer material.

5. A process in accordance with claim 2 wherein said gas mixture also contains a component selected from the group consisting of $H_2$, $CH_4$, $N_2$, $O_2$, CO, Ar and mixtures thereof.

6. A process in accordance with claim 1 which further comprises regenerating the anion exchange resin by desorbing the acid gas.

7. A process in accordance with claim 6 wherein said acid gas is desorbed from the anion exchange resin by reducing the pressure of acid gas above the absorbent by purging with an inert gas at ambient or slightly elevated temperature.

8. A process in accordance with claim 6 wherein said acid gas is desorbed from the anion exchange resin by placing the resin under a dynamic vacuum.

9. A process in accordance with claim 6 wherein said acid gas is desorbed from the anion exchange resin by purging with a humidified inert gas at ambient or slightly elevated temperature.

\* \* \* \* \*